Aug. 2, 1966  A. C. ADAMS ETAL  3,263,600
MACHINE FOR MARKING TUBE-LIKE ARTICLES
Filed Aug. 13, 1964  10 Sheets-Sheet 7
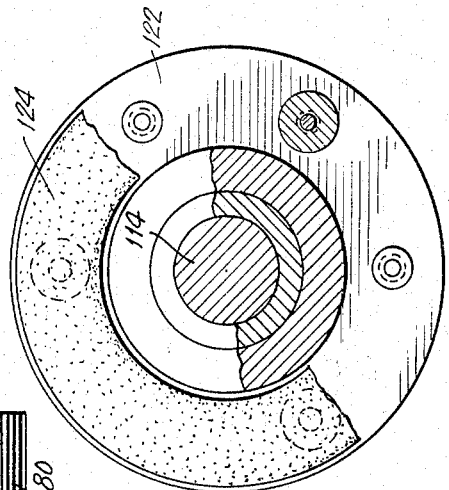
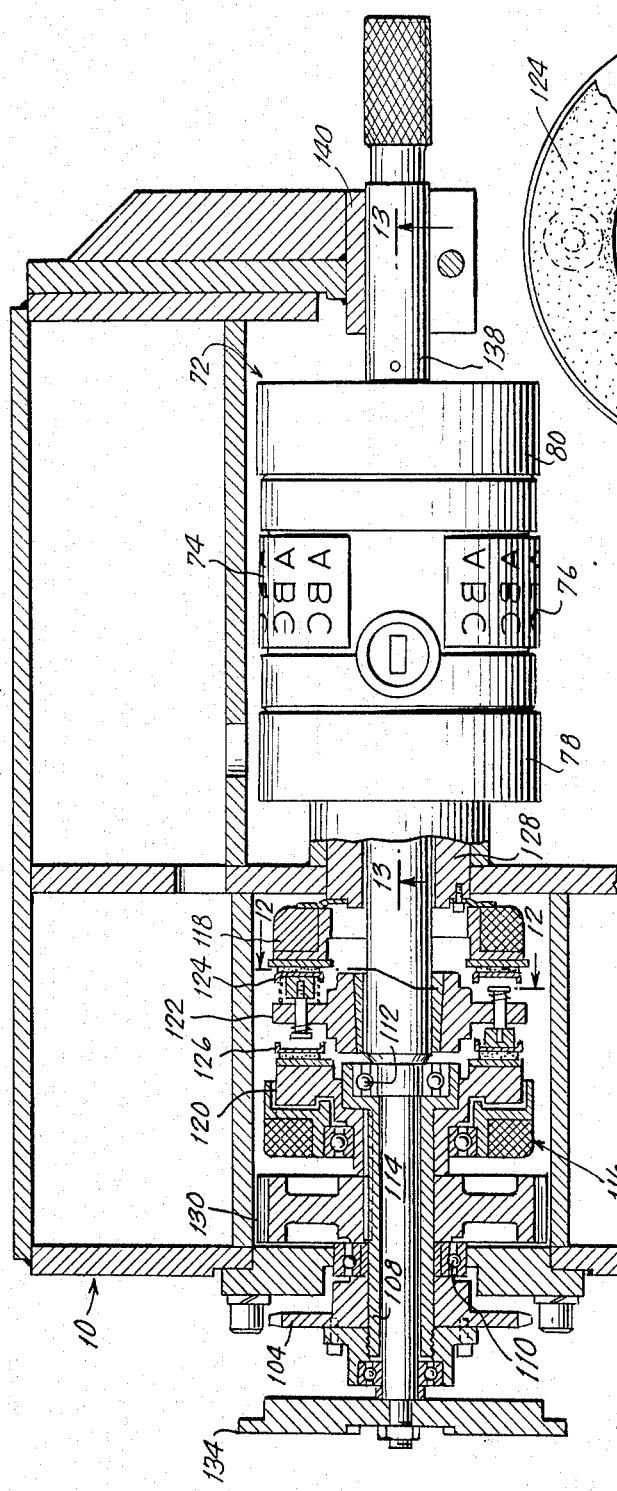
INVENTORS
*ALBERT C. ADAMS*
BY *EDWARD S. BIALOG*
ATTORNEY

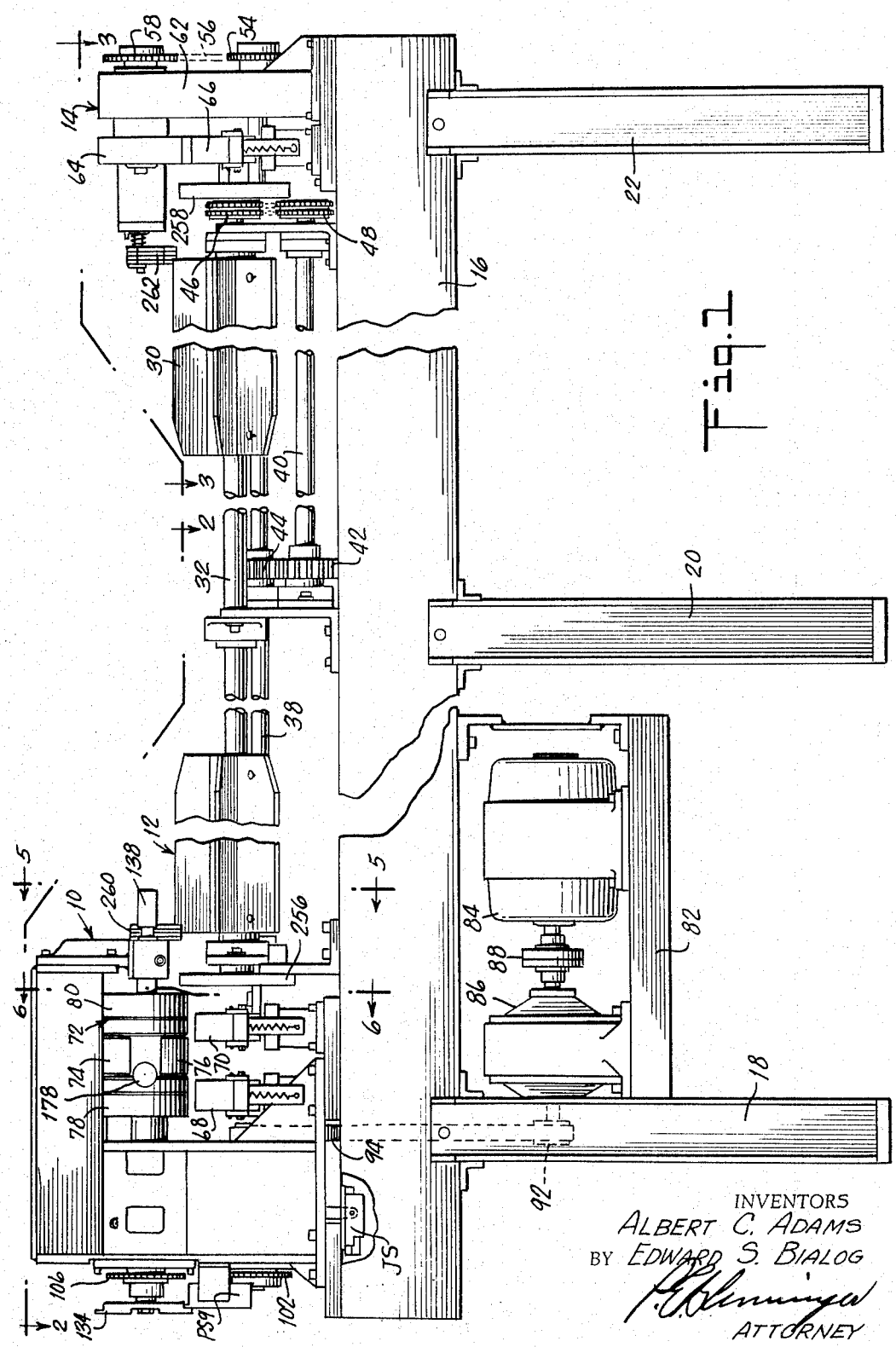

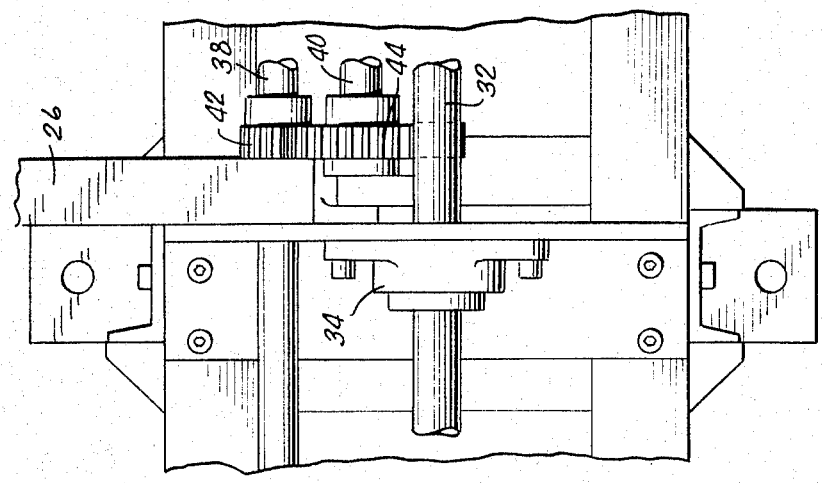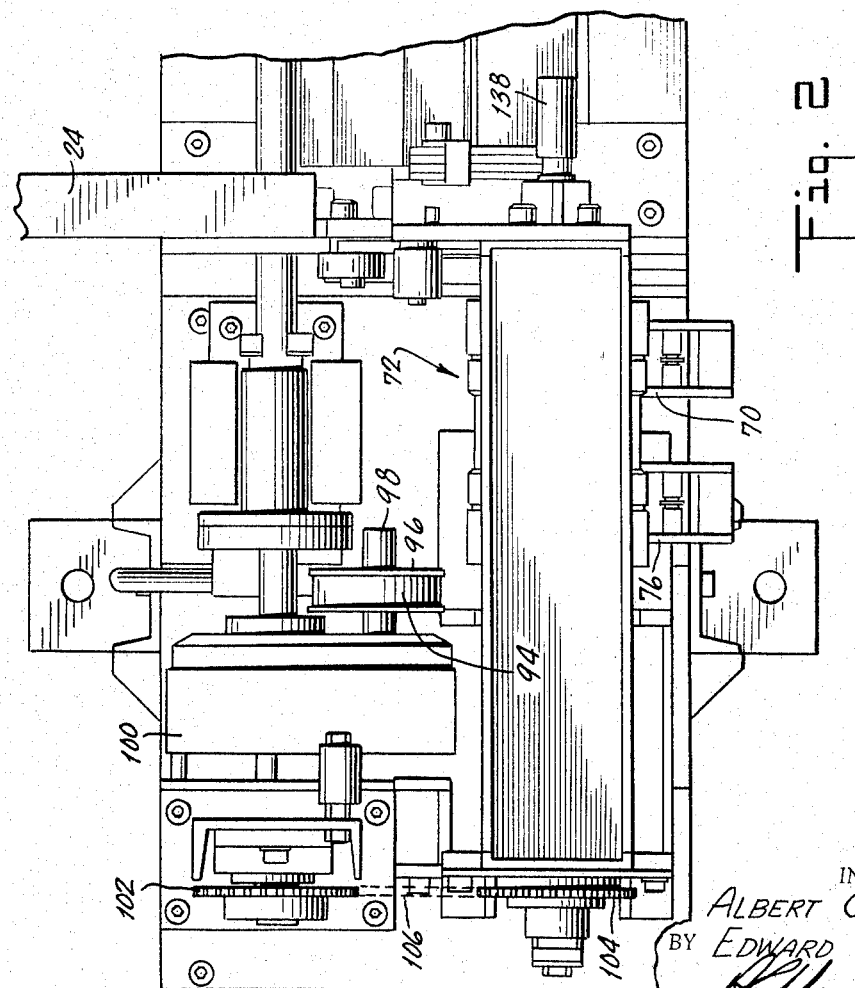

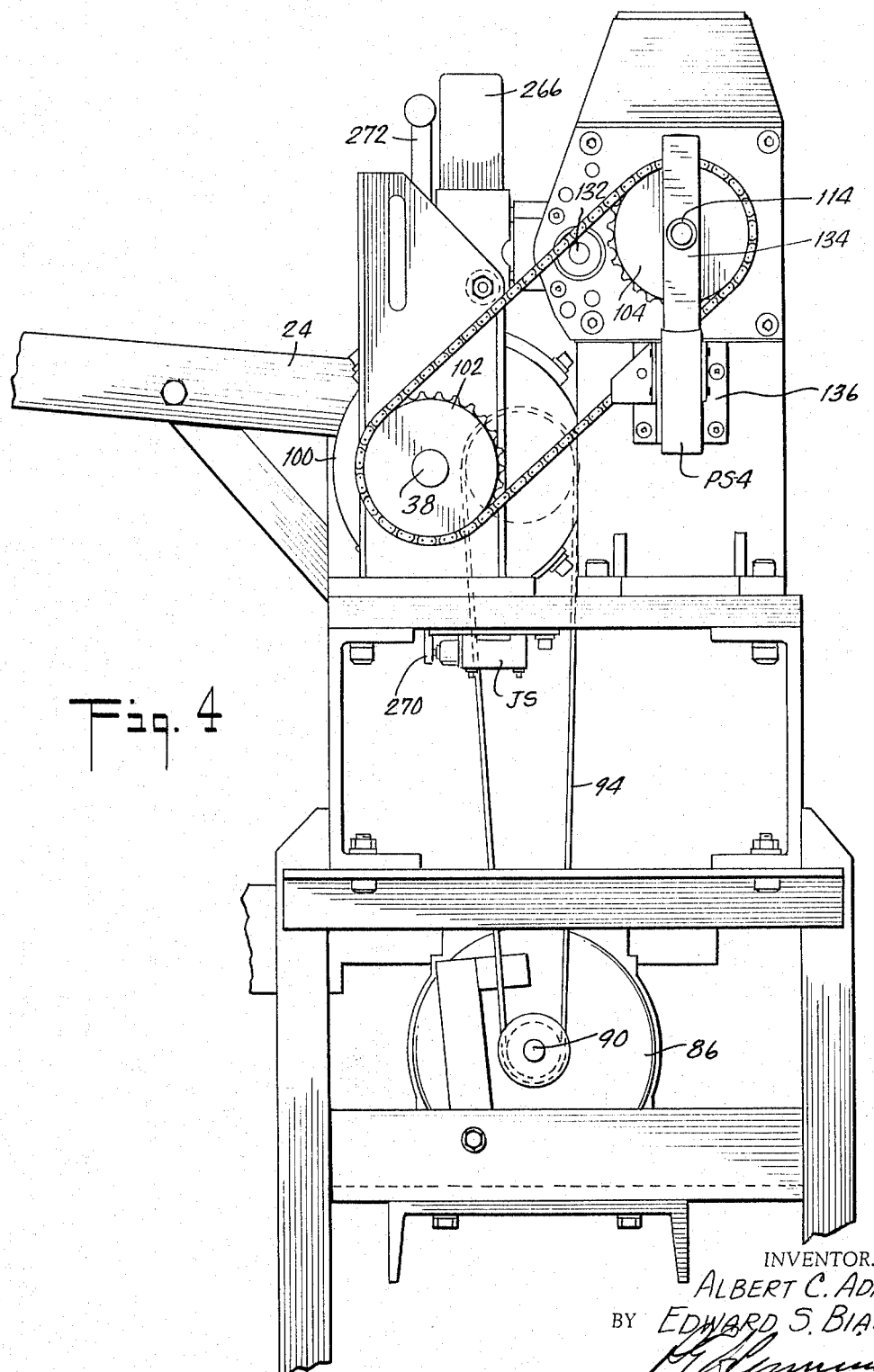

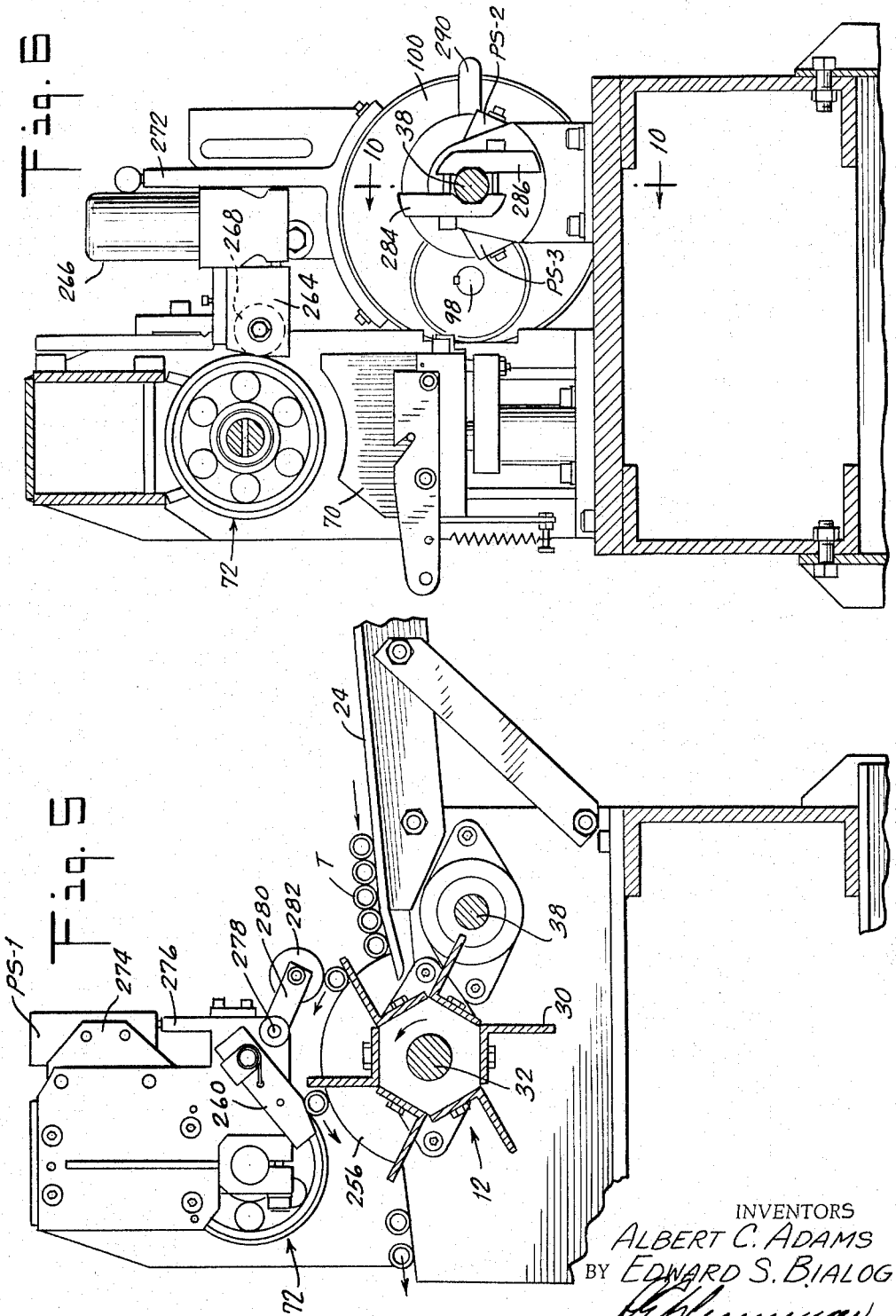

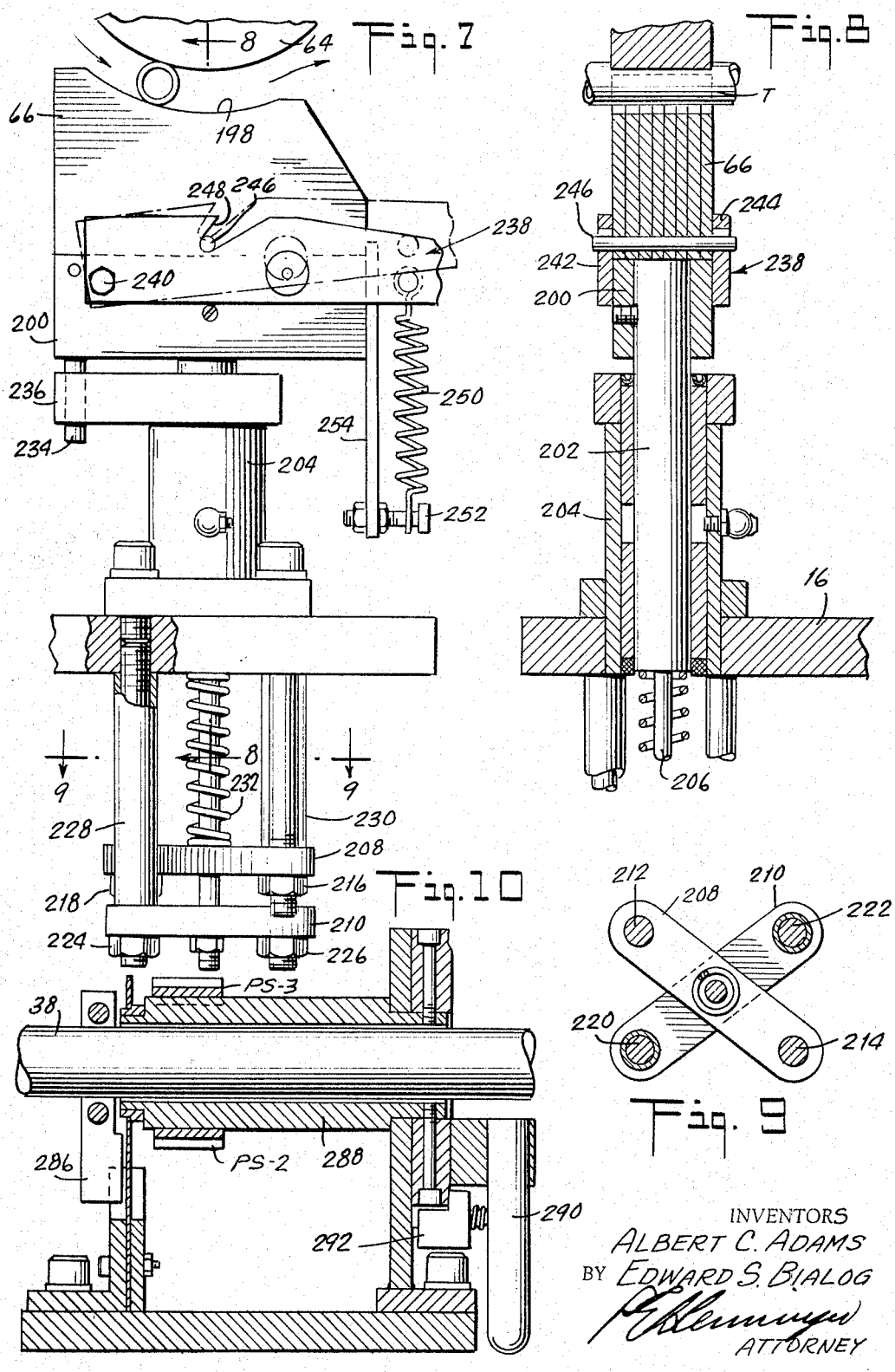

INVENTORS
ALBERT C. ADAMS
BY EDWARD S. BIALOG
ATTORNEY

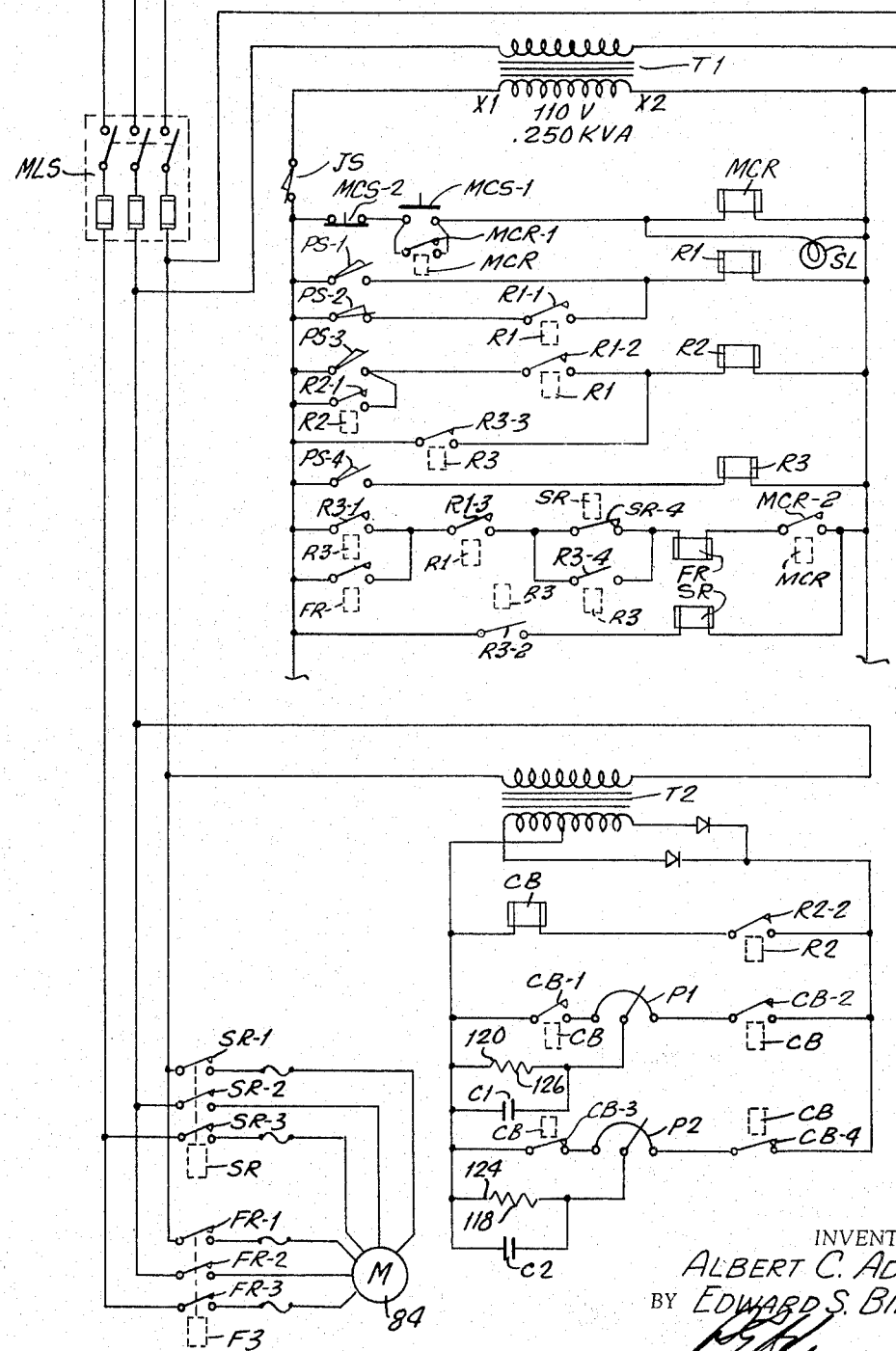

3,263,600
MACHINE FOR MARKING TUBE-LIKE ARTICLES
Albert C. Adams, Flushing, and Edward S. Bialog, West Hempstead, N.Y., assignors to Republic Steel Corporation, Cleveland, Ohio, a corporation of New Jersey
Filed Aug. 13, 1964, Ser. No. 389,286
19 Claims. (Cl. 101—40)

This invention relates to a marking machine. More particularly, the invention relates to a machine adapted to form an imprint at one end of lengths of cylindrical and rod-like articles, in combination with mechanism for counting the number of imprints that are produced. Since the invention was conceived as a tube marking machine and while not so limited, it will, nevertheless, be convenient to describe it in that environment.

Machines for imprinting and marking tubular articles and for counting the imprints are presently available in a number of forms. All of these prior art devices, however, have mechanical characteristics which impose a limitation on the accuracy and speed at which they can perform their intended function. Some of the prior art devices interrupt the forward progress of the object to be imprinted and hold it for free rotation by contact with a rotating marking surface to effect the imprint. In others, the ends of the object to receive the imprint are gripped by rotary chucking devices which rotate the object in contact with a marking surface. In those prior art devices, which are also provided with imprint counters, the counters are customarily mounted in a rotary marking drum and the imprint counter is ordinarily actuated by a simple pendulum at each marking drum rotation. Such counter operators are affected by centrifugal force if the marking drum is operated beyond a relatively low maximum speed, thereby either rendering the counting mechanism unreliable at high operational speeds or imposing on the marking devices a low operating rate in order to insure the accurate registration of the number of imprints.

It is a primary object of the invention to produce a machine as above briefly characterized which is simpler in construction and more rapid and reliable in operation than machines heretofore suggested for the stated purpose.

It is another object of the invention to provide a tube marking machine in which a continuous stream of freely moving tubes can be processed without interrupting their continuous forward movement during the marking operation.

It is still a further object of the invention to provide, in conjunction with a rotary marking drum, an imprint counter which is tamper-proof and which is completely reliable in operation; which is not affected by centrifugal force during rotation of the marking drum; and which, therefore, imposes no limitation on the speed at which the marking drum may be rotated.

It is still another object of the invention to provide a machine for marking tubular articles which is adapted for continuous operation; and which will automatically operate at a higher rate of speed when the articles to be marked are in abundant supply, but which will operate at a lower speed when the supply of articles to be marked is either low or intermittent.

The objectives of the invention are attained herein by providing an intermittently rotatable tube marking drum in a tube marking zone which is defined by the outer surface of the drum and an associated contoured tube supporting surface to which and through which tubes to be marked are advanced in a continuous stream without at any time either halting the forward progress of the tubes or engaging and positively rotating the tubes other than by engagement and rotation thereof by rotating the tube marking drum in contact with the tube in the tube marking zone, together with an imprint counter associated with the rotatable tube marking drum which, by reason of its novel operating mechanism, imposes no limitation on the speed of the marking operation.

The continuous flow of tubes through the marking machine is attained by forming the marking zone as an epicyclic path wherein the rotating marking drum is, by analogy, a sun gear; the tube being marked is, by analogy, a planet gear; and the contoured tube supporting surface is, by analogy, a fixed internal gear. With an epicyclic tube marking path, as described, the rotating marking drum comprises the sole active element which both rotates and simultaneously advances the tube during the marking operation.

The objectives of the invention are further attained herein by providing an intermittently rotating tube marking drum in a tube marking zone which is in the form of an epicyclic path defined by the outer surface of the drum and an associated contoured tube supporting surface to which and through which tubes to be marked are advanced in a continuous stream without at any time halting their forward progress, together with means at the entrance of the epicyclic tube marking path for detecting the presence of a tube, and means responsive to the detecting means for initiating a marking cycle of the drum by rotating the latter under the influence of drum rotating means.

The objectives of the invention as to the imprint counter are further attained by providing a rotary die drum for marking tubes which is in the form of a cylinder in which a stroke counter is mounted in operative association with a pivoted operating lever, whereby one stroke and only one stroke is registered by the stroke counter upon each revolution of the drum. Specifically, the stroke counter is connected by means of an operating crank to a stable element about which the die drum rotates, thereby providing a counter operating means completely divorced from any rotational effect of the drum itself.

Finally, in its fuller aspects, the invention comprises a tube marking machine having a cylindrical intermittently rotatable die drum for imprinting tubes and counting the imprints which are made, which together with an easily selectively replaceable contoured tube supporting surface radially spaced from the drum forms an epicyclic tube receiving path, the width of which can be quickly and easily altered by tube supporting surface substitution to adapt the machine to tubes of a wide range of external diameters; in combination with a continuously rotating tube transfer reel which is adapted to transfer tubes from a supply thereof, one at a time, to the entrance of the tube receiving path at which is located control means responsive to the presence of a tube for initiating the rotation of the die drum to imprint the tube within the tube receiving path; and manually settable means for coordinating operation of the tube transfer reel and the die drum for proper synchronous operation relative to the diameter of the tube being marked.

The objectives, advantages and features of the invention, together with others inherent therein, will become clear when the following description thereof is read in light of the drawings forming a part hereof.

In these drawings, like reference numerals indicate like parts, and:

FIG. 1 is an elevational view of the tube marking machine taken from the discharge side, sections of the machine being broken out to condense the view;

FIG. 2 is a plan view of one section of the machine taken on line 2—2 of FIG. 1;

FIG. 4 is an end elevational view, as viewed from the left in FIG. 1;

FIG. 5 is an elevational view in section along line 5—5 of FIG. 1;

FIG. 6 is an elevational view in section along line 6—6 of FIG. 1;

FIG. 7 is a side elevational view disclosing the details of a tube shoe and its holding mechanism;

FIG. 8 is a vertical sectional view taken on line 8—8 of FIG. 7;

FIG. 9 is a horizontal sectional view taken on line 9—9 of FIG. 7;

FIG. 10 is a sectional detail view taken on line 10—10 of FIG. 6;

FIG. 11 is a vertical sectional view taken through the tube marking assembly and showing in cross section a magnetic brake and clutch assembly, together with associated elements;

FIG. 12 is a sectional view on line 12—12 of FIG. 11;

FIG. 16 is a schematic diagram of the electrical control circuit.

Figure 3:
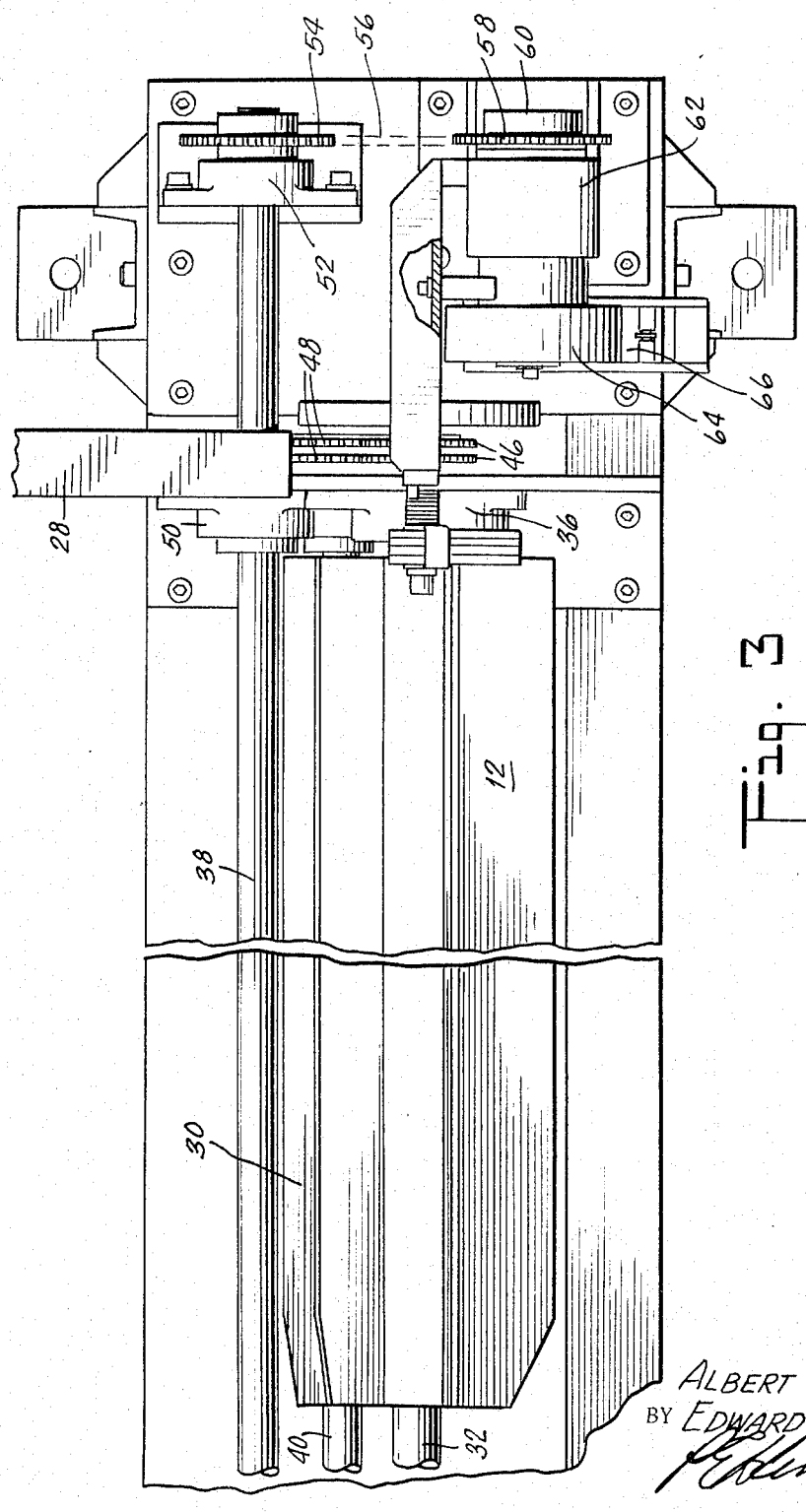
FIG. 3 is a plan view of another section of the machine taken on line 3—3 of FIG. 1.

The tube marking machine here consists of a tube marking assembly 10, a tube transfer reel 12 and a tube guide assembly 14 mounted on a supporting bed 16 disposed at a suitable height by upright standards 18, 20 and 22. The tube marking assembly 10 is disposed at one end of the supporting bed, the tube guide assembly 14 at the other end of the supporting bed while the tube transfer reel extends between the tube marking assembly and the tube guide assembly at the input side of the machine.

As seen in FIGS. 2 and 3, a plurality of runners 24, 26 and 28 extend into proximity of the tube transfer reel 12 such that tubes delivered to the runners can be picked up, one at a time, by the transfer reel 12 which delivers the tubes to the tube marking assembly 10. The transfer reel 12 is constructed of a plurality of equally spaced, generally radial blades 30 (FIG. 5) which are mounted to turn with a reel shaft 32. The reel shaft 32 is mounted for rotation in a plurality of bearings, such as the bearings 34 and 36 (FIGS. 2 and 3). The tube transfer reel is rotated by a drive shaft 38 by way of a counter shaft 40. As seen in FIGS. 1 and 2, the counter shaft 40 is geared to the drive shaft 38 by means of a pair of intermeshing gears 42 and 44 carried respectively by the drive shaft 38 and the counter shaft 40. The reel shaft 32 and the counter shaft 40 have attached thereto drive sprockets 46 and 48 (FIGS. 1 and 3), respectively, which sprockets are connected into driving relation by means of sprocket chains. The drive shaft 38 extends through a set of spaced bearings 50 and 52, as shown in FIG. 3. The end of the drive shaft extending beyond the bearing 52 has attached thereto a drive sprocket 54 which is interconnected by means of a sprocket chain 56 with a sprocket 58 attached to a shaft 60 mounted in a bearing stand 62 forming a part of the tube guide assembly 14. The inner end of the shaft 60 has a roller 64 attached thereto. The roller 64 is vertically aligned with a contoured tube guide shoe 66 on which one end of a tube is adapted to roll during the tube marking operation. A pair of similar contoured shoes 68 and 70 (FIG. 1) are provided in the tube marking assembly 10 for the support of the opposite end of a tube being marked. The contoured shoes 68 and 70 are located in the tube marking assembly in conjunction with a die drum 72. As to be explained later, the die drum is adapted to carry a pair of Flexographic printing plates 74 and 76. The die drum 72 has a pair of tube-engaging areas 78 and 80 so located as to register in the vertical plane respectively of the contoured shoes 68 and 70.

Beneath the supporting bed 16 (FIG. 1) is a platform 82 on which is supported a two-speed motor 84 and a Cleveland Speed Variator 86 the latter being a product of the Cleveland Worm and Gear Company, Cleveland, Ohio. The motor 84 is connected to the Speed Variator by means of a coupling 88. The output shaft 90 of the Speed Variator 86 has thereon a pulley 92 which is coupled by means of a belt 94 and a pulley 96 (FIG. 2) to the input shaft 98 of a Boston Optimount Reducer 100, such as Catalog No. 231D-14 of the Boston Gear Company, Boston, Massachusetts. The reducer 100 is mounted on one end of the drive shaft 38 and is connected thereto in a manner to drive the shaft 38 when the input shaft 98 of the reducer is rotated.

Figure 13:
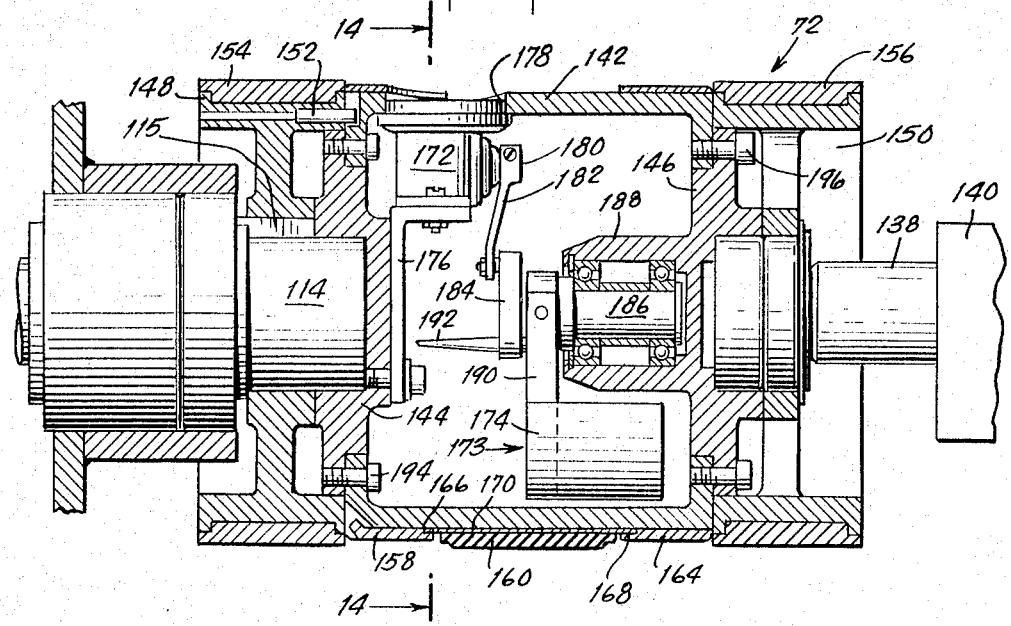
FIG. 13 is an axial sectional view through a die drum taken on line 13—13 of FIG. 11.

An end of the drive shaft 38 extends through the reducer 100 and to the extending end is attached a drive sprocket 102. The drive sprocket 102 is connected to a second drive sprocket 104 by means of a sprocket chain 106. The sprocket 104, as best seen in FIG. 11, is connected to a tubular shaft 108 which is constantly rotated when the marking machine is in use. The shaft 108 is supported in a first set of bearings 110 mounted in the outer wall of the tube marking assembly 10 and in a second set of bearings 112 mounted on an internal die drum control shaft 114. The die drum 72 is mounted on the die control shaft 114 for rotation therewith, as best shown in FIG. 13.

Mounted within the tube marking assembly 10 is a brake and clutch assembly 116 (FIG. 11). This brake and clutch assembly is a magnetically controlled structure such as obtainable from Warner Electric Brake and Clutch Company, Beloit, Wisconsin. The brake and clutch assembly consists essentially of a brake magnet 118 and a spaced clutch magnet 120 having interposed therebetween an armature hub 122 which carries a pair of armatures 124 and 126 related respectively to the brake magnet 118 and the clutch magnet 120. The brake magnet 118 is held against rotation with or about the shaft 114 by reason of attachment to a sleeve 128 which is fixed in the tube marking assembly housing. The armature hub 122 is fixed to the internal shaft 114 while the clutch magnet 120 is fixed to the tubular shaft 108. Also attached to the tubular shaft 108 is an inking roller drive gear 130 which operates in contact with a gear on an inking roller shaft 132 (FIG. 4). The free end of the internal shaft 114 has attached thereto a switch armature 134 (FIGS. 4 and 12) which operates in conjunctioin with a proximity switch PS-4, which is held in a switch bracket 136 at the face of the tube marking assembly housing.

The right end of the die roller 72 as seen in FIG. 11 is supported for rotation on a stub shaft 138 removably held in a stub shaft bracket 140 which is fixed to a face of the tube marking assembly housing.

When the motor 84 is energized, it will deliver power through the variator 86 and by way of the drive belt 94 to the input shaft 98 of the reducer 100. As a result, the drive shaft 38 associated with the tube transfer reel will be rotated. The tube transfer reel itself will be rotated as well as the guide roller 64. At the same time, driving power is delivered from the reducer 100 to the sprocket 102 and by way of the sprocket chain 106 to the sprocket 104. As the sprocket 104 is rotated, it will drive the tubular shaft 108.

The internal die drum drive shaft 114 will not be rotated since it is assumed that the brake magnet 118 is energized and thus engages the armature 124 while the clutch magnet 120 is deenergized and, therefore, has no effect on the clutch armature 126. However, if the conditions are reversed, i.e. the brake magnet 118 is deenergized and the clutch magnet 120 is energized, the internal die drum control shaft 114 will be rotated with the result that the die drum 72 will also be rotated. This function follows from the fact that the clutch magnet 120 is fixed to the tubular shaft 108 and, therefore, rotates with that shaft whenever the shaft is driven, and from the fact that the armature hub 122 which is fixed to the internal shaft 114 will be driven by reason of the fact that the clutch armature 126 carried thereby is magnetically coupled to the clutch magnet 120. The manner in which the magnetic brake and clutch assembly is controlled to intermittently rotate the die drum 72, when required, for marking a tube will be explained in connection with the explanation of the control circuit of FIG. 16.

Figure 14:
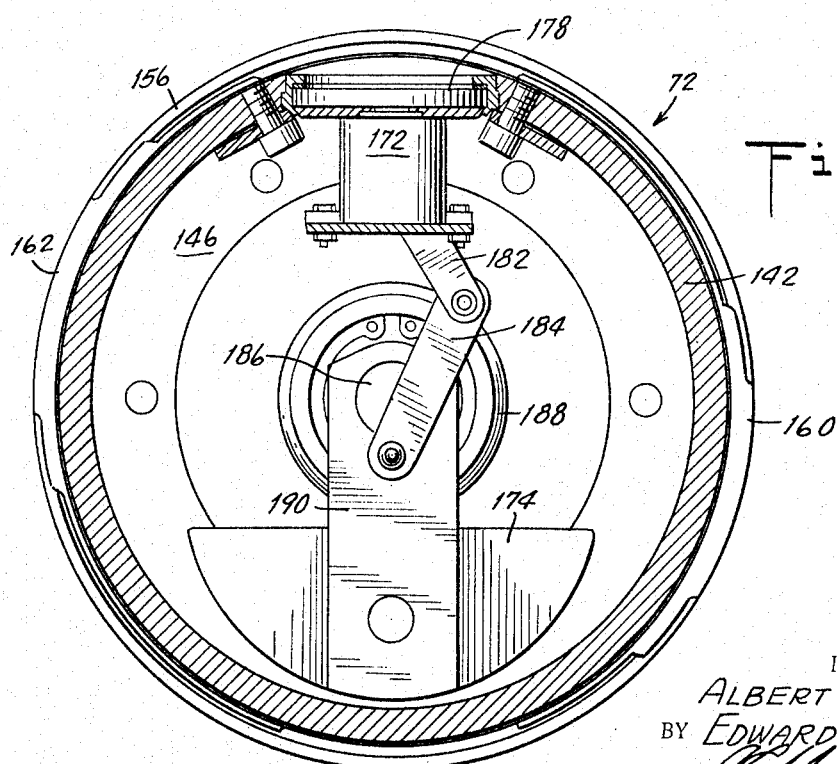
FIG. 14 is an axial sectional view of the die drum taken on line 14—14 of FIG. 13.

The operation of the die drum 72 is not only effective to mark the tubes being processed but is also so constructed as to count each of the marking operations. The nature of the die drum 72 is best ascertained by reference to FIGS. 13 and 14; FIG. 13 being an axial section through the drum, and FIG. 14 being a radial section. The die drum consists of a generally tubular shell 142 which is closed by a pair of end caps 144 and 146. The end caps 144 and 146 carry a pair of rollers 148 and 150, respectively, which are engaged in drive relation with the end caps by pins, such as the pin 152 shown in FIG. 13. The end cap 144 is recessed to accommodate the end of the die roll shaft 114. End cap 146 is similarly recessed to accommodate the end of the stub shaft 138 on which it turns. Key 115 couples shaft 114 and roller 148. Each of the rollers 148 and 150 is covered with a band of polyurethane 154 as to the roller 148, and a similar band 156 as to the roller 150. These bands provide traction in contact with a tube being marked such that as the tube passes between the die drum 72 and the contoured shoes 68 and 70, it will be rotated to take the impression being marked thereon.

The shell 142 has attached thereto a band 158 which is adapted to engage one edge of the Flexographic printing plates 160 and 162. A similar band 164 surrounds the opposite end of the shell 142. The band 158 may be fixed to the shell 142 while the band 164 is removably carried by the shell. By reference to FIG. 13, it can be seen that the confronting edges of the bands 158 and 164 are undercut as at 166 and 168 to receive the laterally extending edges of a thin metal plate 170 constituting a backing member for the marking surface of the Flexographic printing plates 160 and 162.

From the foregoing, it can be seen that when the stub shaft 138 is released and withdrawn from the die drum that the drum can be shifted to the right in an axial direction, as viewed in FIG. 13, to completely remove the drum from engagement with its driving shaft 114. Removal of the roller 150 by a simple axial movement will permit axial movement of the band 164 to permit withdrawal and replacement of the printing plates 160 and 162.

Within the shell 142 is mounted the mechanism for counting the revolutions of the die drum and thus the number of tubes that have been marked. This mechanism comprises a conventional stroke counter 172 of the type manufactured and sold by the Veeder Root Company, or by General Controls, and an operating assembly connected to the counter input shaft. The stroke counter 172 is mounted on a bracket 176 in such position that the face of the counter is exposed at a viewing window 178 in the wall of the shell 142. The input shaft 180 of the stroke counter is connected to one end of a crank consisting of a lever 182 and a link 184. The other end of the crank, in turn, is connected to a weighted stable element 173. The stable element 173 has a shaft 186 which is mounted for rotation in a bearing hub 188 extending inwardly from the end cap 146. An arm 190 of the stable element 173 has extending therefrom a tapered pin 192 which is adapted to extend through an eye in the link 184 whereby the crank and the stable element are operatively connected to each other in a manner that facilitates assembly of the mechanism. The free end of the arm 190 has a stabilizing weight 174 attached thereto. The stroke counter is thus connected by means of the operating crank to the stable element about which the die drum rotates, thereby providing a counter operating means completely divorced from any rotational velocity of the drum itself.

The end cap 144 with the stroke counter 172 and operating crank mounted thereon may first be connected to the shell 142 by means of screws 194 which are accessible from the interior of the shell 142. The end cap 146 with the stabilizing element 173 mounted in its hub 188 may then be assembled with the other end of the shell 142 by inserting the pin 192 through the eye in the link 184 as the cap 146 is brought into engagement with the shell 142, and then connecting the cap to the shell by screws 196 which are accessible from the exterior of the drum. The end cap 146 may be locked to the shell 142 by a seal to render the unit tamperproof.

The contoured shoes 66, 68 and 70 of FIG. 1 have been mentioned heretofore as forming a spring-cushioned support for the opposite ends of the tube as it goes through the machine. These shoes and their supporting mechanism are shown in greater detail in FIGS. 7 through 9 to which reference is made in connection with the following.

FIGS. 7 and 8 show the construction of the shoe 66 and the support which is provided for it. A description of FIGS. 7 through 9 will provide an understanding of the three shoes shown in FIG. 1 inasmuch as the shoes and their supporting mechanisms are identical. The shoes themselves are conveniently constructed of laminated Micarta and provide a contoured surface 198 which is formed on a radial extension of the roller 64 or of the drum sleeves 154 and 156. The gap between the roller 64 and the sleeves 154 and 156 of the drum, and the contoured surface 198 of the shoes through which the tubes must pass is made greater or smaller to accommodate tubes of various diameters by providing different sets of shoes as dictated by the range of tube diameters. Consequently, the shoe supporting mechanism is designed to hold the shoe securely yet permit rapid interchange of different shoes.

A supporting head 200 is attached to the upper end of a vertical rod 202 which is mounted for limited reciprocation in a supporting sleeve 204 extending upwardly through the supporting bed of the machine. The rod 202 has connected thereto a downwardly extending rod 206 of reduced diameter which extends through a pair of crossed plates 208 and 210. The plate 208 interconnects the lower end of a pair of strain rods 212 and 214 which depend downwardly from the bed plate of the machine, the plate 208 being retained on the strain rods by means of nuts 216 and 218 threaded onto the free end of the rods. The plate 210 is held on a pair of strain rods 220 and 222, also depending downwardly from the bed plate of the machine, by means of nuts 224 and 226 screwed onto the free ends of the latter. The position of the plate 210 along the rods 220 and 222 is fixed by sleeves 228 and 230 surrounding the rods 220 and 222, respectively.

A compression spring 232 surrounds the rod 206. The spring 232 abuts the plate 208 at one end and the shoulder formed between the rod 202 and its extension 206 at its other end.

A supporting head 200 is an elongated structure having a guide pin 234 at its rear end. The guide pin 234 extends through a guide hole in an elongated flange 236 of the supporting sleeve 204 so that the supporting head may yield in a vertical direction without any rocking motion about the axes of the rod 202. It can be seen, therefore, that the shoe mounting structure can yield to somewhat enlarge the gap between the shoe and the roller 64 or the die drum 72 and its associated shoes 68 and 70, as may be required by an irregularity in the diameter of the tube.

A clamp member 238 is pivoted to the supporting head 200 by means of pivot pins 240. The clamp member consists of a pair of plates 242 and 244 which are interconnected at their forwardly extending end by means of a handle (not shown). Each of the shoes 66 has a pin 246 which extends from the lateral faces of the shoe near its base. This pin is adapted to be engaged by a keeper recess 248 formed in the upper edge of each of the plates 242 and 244 of the clamp member. The clamp member is spring-biased in a clockwise direction about its pivot 240 by means of a spring 250 which is connected between the clamp member and a stud 252 carried at the free end of a bracket 254 attached to and depending from the supporting head 200. If the clamp member is manually elevated to the dot-dash line position of FIG. 7, the pin 246 will be disengaged so that the shoe 66 can be easily removed from the supporting mechanism. By the same token, when the pin is engaged by the keeper notches 246 under influence of the spring 250, the shoes will be securely held in their operative position. Thus, there is provided a tube marking zone which is in the form of an epicyclic path defined by the outer surface of the drum and the inner faces of the tube supporting surfaces which are associated with the marking drum. The tubes are, by analogy, sun gears being rotated and advanced between the face of the drum and the confronting faces of the contoured tube supporting surfaces, which are, respectively and by analogy, a rotary sun gear and a fixed internal ring gear. The rotating drum is, therefore, the primary active element by which the tubes are rotated and advanced through the tube marking zone.

Tube feed disks 256 and 258 are removably mounte on the ends of the reel shaft 32 (FIG. 1). These feed disks support the opposite ends of the tubes as they are being carried through the machine by the transfer reel. By reference to FIG. 5, it can be seen that the disk 256, in effect, supports the tube at one end such that only the free edges of the transfer reel paddles 30 engage the tubes as they are carried through the machine. It is apparent, therefore, that the size of the tube being marked will also dictate the diameter of the feed disk that must be employed. It is for this reason that the disks are readily removed from and mounted on the ends of the reel shaft 32. Associated with the tube feed disk 256 is a pivoted tube contact finger 260. Similarly, associated with the tube feed disk 258 at the opposite end of the machine is a pivoted tube contact finger 262. Both fingers 260 and 262 are spring-biased in a downward direction, so that the tubes are held in close contact with the respective feed disks 256 and 258.

FIG. 6 discloses the manner in which the printing plates on the die roller are inked. In this figure, an ink fountain 264 receives a continuous supply of ink from an ink receptacle 266 and from the fountain 264 the ink is applied from a continuously operating inking roller 268 to the printing plates carried by the intermittently operating die drum 72.

The entire mechanism is synchronized by an electric control circuit which includes a plurality of proximity switches adapted to sense the presence of a tube, the status of the machine cycle, and the like. Before proceeding to a description of the control circuit, it will be useful to locate and identify the various proximity switches which are involved. As previously stated, the reducer 100 is mounted on the drive shaft 38. The reducer is held against rotation by a quick release latch (not shown), such that in case a tube becomes jammed in the machine or some other malfunction occurs, the quick release latch will open and permit the reducer 100 to rotate for a limited distance in a counter-clockwise direction, as viewed in FIG. 6, for example. This will result in a slackening of the drive belt 94 to an extent which will no longer drive the reducer. More important, however, is the fact that a downwardly extending finger 270 attached to the casing of the reducer (FIG. 4) will operate a jam kick-out switch JS, which will cut the power to the control circuit. The reducer 100 is restored to its normal operative position by means of a lever 272 attached to and extending upwardly from its casing.

FIG. 5 shows a proximity switch PS-1 attached to the tube marking assembly housing by means of a bracket 274. The switch PS-1 is sensitive to a pivoted armature 276 which is rocked about its pivot 278 by means of a lever 280 having at its free end a roller 282 which engages a tube as it is carried forward by the tube transfer reel. When a tube is properly in position, the lever 280 and consequently the armature 276 will be rocked in a counterclockwise direction, as viewed in FIG. 5, such that the armature 276 is removed from close contact with the proximity switch PS-1 thereby operating the switch. By the same token, the lever 280 and the armature 276 will move in a clockwise direction in the absence of a tube thereby permitting the switch PS-1 to open and providing a signal that no tube is in position at that point on the tube transfer reel.

The drive shaft 38 (FIG. 6) has associated therewith a pair of proximity switches PS-2 and PS-3. While these switches occupy a fixed relation to each other, they are, however, adjustable angularly in this relationship about the drive shaft upon manual movement of the lever 290. The switches PS-2 and PS-3 are under the influence of a pair of armatures 284 and 286 which are attached to the drive shaft 38 and rotate therewith. FIG. 10 shows the switches PS-2 and PS-3 mounted on a sleeve 288 which surrounds the drive shaft 38. The sleeve 288 is mounted for rotary adjustment about the drive shaft 38 and such adjustment can be effected through the adjusting lever 290, as stated. The sleeve 288 is retained in an adjusted position by means of a spring-pressed latch 292. From the foregoing, it can be seen that the angular adjustment of the switches PS-2 and PS-3 with respect to the armatures 284 and 286 can be altered as the timing considerations of the machine cycle may require.

Figure 15:
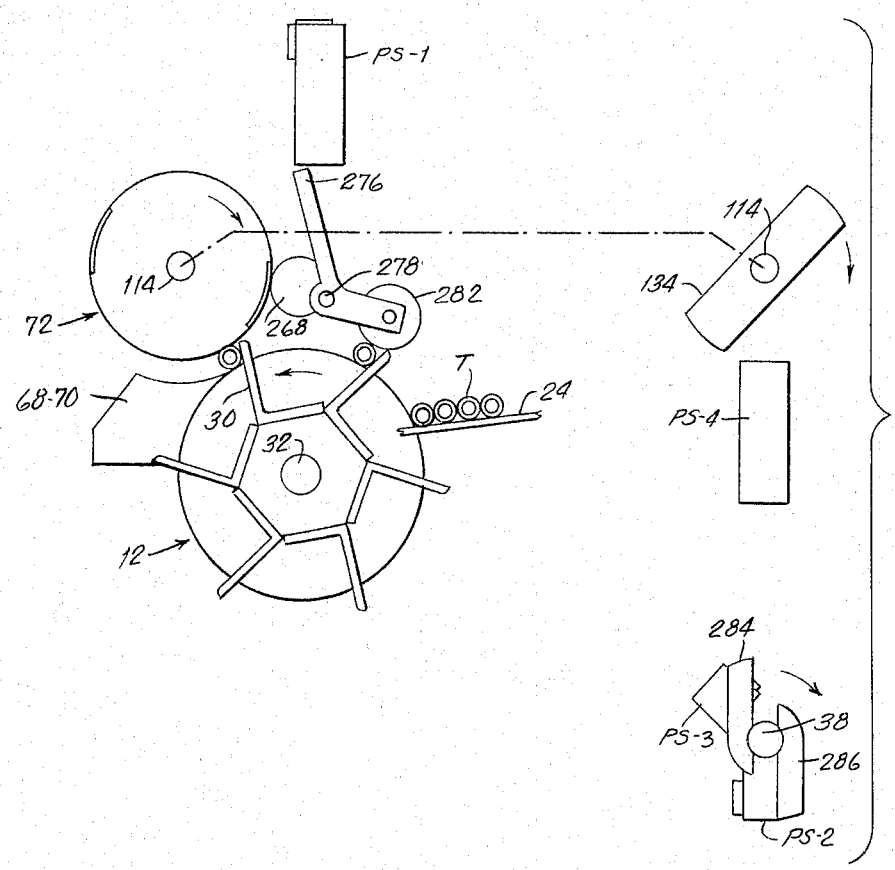
FIG. 15 is a diagrammatic representation of certain operational elements of the tube marking machine in conjunction with associated proximity switches by which machine operation is controlled.

Mention has been made hereinbefore of the proximity switch PS-4 shown in FIG. 4 in conjunction with its operating armature 134. The several switches, their operators, and their function, as dealt with above, are also shown in diagrammatic manner in FIG. 15.

The electrical control circuit is shown in diagrammatic form in FIG. 16. In this figure, the motor 84 is connected to the power source through two sets of relay points SR-1, SR-2, SR-3 and FR-1, FR-2 and FR-3. As stated before, the motor 84 is a two speed motor. Consequently, when the SR-1, SR-2 and SR-3 relay points are closed, the motor will operate at slow speed, whereas the opening of the latter points and closure of points FR-1, FR-2 and FR-3 will permit the motor to operate at high speed. Power for operating the control relay circuits is derived from a transformer T1, while power for operating the clutch and brake circuits is derived from a transformer T2.

Assuming that the master line switch MLS is closed, the machine is put into operation by closing the master control switch MCS-1. This will establish a circuit across the line through a signal lamp SL and through a master control relay MCR which is held energized through its own points MCR-1. This circuit is also controlled by an emergency cut-out switch MCS-2 which is normally closed but which can be used for manually disabling the circuit.

When the master control relay MCR is energized it will close its points MCR-2 which are disposed in the motor speed control relay circuit. This latter circuit includes a slow motor relay SR and a fast motor relay FR. Upon closure of the master control relay points MCR-2, a circuit is immediately established to the slow motor control relay SR by reason of the normally closed relay point R3-2 which completes the circuit across the line. Upon energization of the slow motor relay SR, the relay points SR-1, SR-2 and SR-3 in the motor circuit will be closed whereupon the motor 84 will be energized to turn at a slow speed. As the motor turns and tubes are fed to the runners and into proximity of the transfer reel, the reel will pick up the first tube and advance it forwardly into contact with the tube sensing roller 282 which will cause the armature 276 to move out of proximity of the switch PS–1, thereby closing the same.

Closure of the proximity switch PS–1 will energize a tube sense relay R1. When the tube sense relay R1 is energized, it will close its points R1–1, R1–2 and R1–3. Closure of points R1–3 will condition the motor speed control circuit to shift into high speed.

When the relay point R1–1 is closed, it will indicate the presence of a tube on the tube transfer reel. However, since the tube sense relay R1 remains energized via the normally closed switch PS–2 and its now closed points R1–1, it is necessary to confirm the presence of a tube by momentarily opening the switch PS–2. If a tube is present at the entrance to the marking zone, the relay R1 will be maintained energized through the closed switch PS–1. Otherwise, opening of the switch PS–2 will drop out relay R1. The switch PS–2 opens and closes while the switch PS–1 is closed. It will be remembered that the switch PS–2 is operated by an armature 286 which is driven by the drive shaft.

The armature 284, also driven by the drive shaft, operates the switch PS–3, as stated. When this switch is closed, a circuit will be established to the clutch-brake control relay R2 by reason of the fact that the points R1–2 of the tube sense relay R1 in the circuit of the clutch-brake control relay circuit are closed. Energization of the clutch-brake relay R2 is maintained by closure of its own points R2–1 in its energizing circuit.

During the occurrence of the foregoing sequence, the die drum control brake has been energized by reason of the normally closed relay points CB–3 and CB–4 in its energizing circuit. These relay points are under control of a clutch-brake release relay CB which, in turn, is energized upon closure of the R2–2 points of the clutch-brake control relay R2. Also, under control of the clutch-brake release relay CB are a pair of normally open relay points CB–1 and CB–2 in the clutch circuit. When the clutch-brake release relay CB is energized, as a result of the transfer of the points R2–2 of clutch-brake control relay R2, the points CB–3 and CB–4, normally closed, are now open to release the die drum control brake so that the die drum control clutch may be energized. The energization of the clutch takes place upon closure of the relay points CB–1 and CB–2. The clutch circuit has a voltage regulating potentiometer P1 and a condenser C1 therein. A similar potentiometer P2 and condenser C2 are incorporated in the brake control circuit.

As the die drum begins to rotate, it will rotate the armature 134 which controls the proximity switch PS–4. Closure of the switch PS–4 will energize the die drum control relay R3. The motor will now be driven at high speed by reason of reversal of the relay points R3–1 and R3–2 in the circuit of the motor speed control relay SR and FR. The normally closed points R3–2 are opened thereby deenergizing the slow motor relay SR, while the points R3–1 and R3–4 will be closed thereby energizing the fast motor relay FR. Deenergization of the relay SR and energization of the relay FR will result in opening the relay points SR–1, SR–2 and SR–3 in the motor circuit and the closure of relay points FR–1, FR–2 and FR–3 in the motor circuit, thereby causing operation of the motor at a high speed.

It can be seen from the foregoing that the presence of a tube on the tube transfer reel activates the switch which increases the speed of the two speed motor. Conversely, the absence of a tube on the transfer reel will decrease the speed of the motor and the printing mechanism. The two-speed control serves a dual purpose. The slow start-up enables the clutch and brake to operate at slower speed thereby increasing the accuracy with which the printing plate on the die roll is positioned. It also permits operation of the machine at lower speed when the rate of tube production is low.

In case no tube is present on the transfer reel, both proximity switches PS–1 and PS–2 will open at the same time thereby dropping out relays R1 and R2. The consequence of this condition is the shift of motor speed to slow by reason of the fact that the relay point R1–3 is now open and the normally closed relay point R3–2, now being closed, thereby energizes the slow motor speed relay SR and deenergizing the fast motor speed relay FR, with the result that the FR–1, FR–2 and FR–3 points in the motor circuit are opened and the SR–1, SR–2 and SR–3 points in the motor circuit are closed.

The die drum will continue to rotate until the switch PS–4 is opened, whereupon relays R2 and R3 will drop out. Relay R2 is deenergized by the opening of the relay points R2–2 in its circuit, noting that the points R1–2 were previously closed. Deenergization of the clutch-brake control relay R2 will cause release of the clutch and the application of the brake. At this time, the relay point R2–2 in the circuit of the clutch-brake release relay CB will open whereby the clutch-brake release relay CB will be deenergized. This will result in the opening of the CB–1 and CB–2 relay points in the clutch circuit and the return of the normally closed CB–3 and CB–4 relay points in the brake circuit.

In any event, the die drum control relay R3 will be held energized and will maintain its R3–3 points closed to maintain energized the clutch-brake relay R2 sufficiently long after the opening of the switches PS–1 and PS–2 to permit completion of the marking operation under way at the time and to cause the delivery of the last tube from the machine. At this point the armature 134, which is driven by the die drum control shaft, will be in a vertical position, thereby operating the switch PS–4 to stop the die drum with one end of a printing plate just short of the continuously rotating inking roller. With these conditions prevalent, the machine will continue to be driven at low speed until another tube is picked up and the switch PS–1 is operated thereby to once again initiate the high speed printing cycle. The machine is shut down by opening the master control switch MCS–2 to deenergize the master control relay MCR which will open its points MCR–2 which are in control of the motor speed control relays FR and SR. This will result in the dropping out of that one of the motor speed control relays FR or SR which at the time is energized. Now the SR–1, SR–2, SR–3, FR–1, FR–2 and FR–3 relay points will all be open thereby isolating the motor 84 from the power line.

From the foregoing, it can be seen that the machine is easily and quickly adapted to the marking of tubes varying in a wide range of external diameters. As stated, the machine is physically conditioned to tubes of varying diameters by the simple expedient of installing in the machine a set of contoured tube supporting surfaces 66, 68 and 70 appropriate to the external diameter of the tubes to be marked together with corresponding tube feed disks 256 and 258.

Ordinarily, the machine will be operated at a higher speed when marking tubes of small diameter, and at a lower speed as the external diameter of the tubes increases. An optimum marking speed can be determined by adjusting the Speed Variator 86. The proper time relationship between the transfer reel 12 and the marking drum 72, as when production shifts from one tube diameter to another, is maintained by the angular adjustment of the switches PS–2 and PS–3 about the shaft 38. The switches PS–2 and PS–3 are adjusted, as stated, by means of the handle 290 which can be turned by hand as may be necessary.

While the novel features of the invention have been illustrated and described in connection with a specific embodiment of the invention, it is believed that this embodiment will enable others skilled in the art to apply the principles of the invention in forms departing from the

What is claimed is:

1. In a machine for marking tube-like articles, a rotatable die drum, tube marking means on the surface of said die drum, and epicyclic tube path comprising a tube marking zone defined by a contoured tube supporting surface associated with said die drum in radially spaced relation thereto, rotary means for delivering tubes to said marking zone, means for intermittently rotating said die drum to mark a tube in said tube marking zone and for providing the sole active force for continuously and freely advancing a tube through said epicyclic path, means operative to rotate said tube delivery means at a first rate of rotation, means operative to rotate said tube delivery means at a second rate of rotation, means at the entrance to said tube marking zone for detecting the presence of a tube, and means responsive to said last-named means for initiating a marking cycle of said drum by rotation thereof under the influence of said drum rotating means and for selecting said second rate of operation of said tube delivery means.

2. In a machine for continuously marking in serial order tube-like articles supplied thereto in a continuous stream, a drive shaft, a die drum having tube marking means on the surface thereof, an epicyclic tube path comprising a tube marking zone defined by a contoured tube supporting surface associated with said drum in radially spaced relation thereto, a die drum shaft, a driving connection between said drive shaft and said die drum shaft, a clutch between said die drum shaft and said die drum, means responsive to a tube at the entrance of said tube marking zone for conditioning said clutch for operation, and means responsive to the rotational position of said drive shaft for engaging said clutch to connect said die drum and said die drum shaft into die drum driving relation.

3. The machine of claim 2, in which said means responsive to a tube at the entrance of said tube marking zone also conditions control means adapted to rotate said drum at an increased speed, and means responsive to the rotational position of said die drum for increasing the rotational speed of said drive shaft.

4. The machine of claim 2, in which said die drum has a brake associated therewith, and means responsive to the rotational position of said drive shaft adapted to release said clutch and apply said brake.

5. The machine of claim 2, in which said means responsive to a tube at the entrance of said marking zone for conditioning said clutch for operation has means associated therewith responsive to the rotational position of said drive shaft for sensing the presence of a tube at the entrance of said tube marking zone and for transmitting a signal in conjunction with said first tube sensing means.

6. The machine of claim 2, in which the die drum is in the form of a cylinder and the same has a rotation counter mounted therein for rotation therewith and being adapted for counting the revolutions of said drum when operating said drum at high speed, in combination with a stable element mounted within said cylinder about which said drum rotates, and means interconnecting said stable element and said counter whereby said counter is positively driven during rotation of said drum.

7. The machine of claim 6, wherein said counter has an operating shaft, said stable element is a pendulous weight about which said drum rotates, and said interconnecting means therebetween and said counter is a crank arm one end of which is fixed to said operating shaft and the other end is pivotally attached to said pendulous weight.

8. The machine of claim 2, in which said die drum shaft has connected thereto a two-speed drive motor having an electrical control circuit, and said die drum carries in rotation therewith an electric switch element in said control circuit of said drive motor.

9. The machine of claim 2, in which said clutch is an electromagnetic clutch having a normally open electrical control circuit, and in which the means responsive to the rotational position of said drive shaft comprises means for closing said electrical control circuit.

10. The machine of claim 2, in which said clutch is an electrically controlled clutch and has an electrically controlled brake associated therewith for holding said die drum against rotation when said clutch is deenergized, an electrical control circuit for said clutch and said brake, and in which the means responsive to the rotational position of said drive shaft comprises a switch element in said control circuit for releasing said brake and engaging said clutch during rotation of said shaft.

11. The machine of claim 2, wherein said drive shaft is driven by a two-speed motor, said clutch is an electromagnetic clutch which has associated therewith an electromagnetic brake for holding said die drum against rotation when said clutch is deenergized, in combination with an electric control circuit for said motor, said clutch, and said brake, and in which said die drum has mounted for rotation therewith a switch element in said circuit for controlling the speed of said motor and said drive shaft has mounted for rotation therewith a switch element in control of said clutch and brake circuit.

12. The machine of claim 2, in which said contoured tube support surface comprises a separable block having a laterally projecting latch element therein in combination with a block holder under said die drum adapted to support said block in position in respect to said die drum, and a keeper pivoted to said block holder adapted to engage said latch element and hold said block in quick-release relation on said holder.

13. The machine of claim 12, in which said block holder is spring biased toward said die drum, and having therein means for limiting movement of said block holder toward said die drum.

14. In a machine for marking tube-like articles, a die drum having tube marking means on the surface thereof, an epicyclic tube path comprising a tube marking zone defined by a contoured tube supporting surface associated with said drum in radially spaced relation thereto, a driven die drum shaft, means for initially rotating said shaft at a low speed, a clutch between said shaft and said die drum, means for actuating said clutch to drive said die drum while said shaft is turning at low speed, and means responsive to the rotational position of said die drum for increasing the rotational speed of said die drum shaft.

15. The machine of claim 14, in which said die drum shaft has connected thereto a two-speed drive motor, and said means responsive to the rotational position of said die drum is an electric switch in the control circuit of said drive motor.

16. The machine of claim 14, in which said clutch is an electromagnetic clutch having a normally open electrical control circuit, a drive shaft in said machine, and means responsive to the rotational position of said drive shaft for closing said electrical control circuit.

17. The machine of claim 14, in which said clutch is an electromagnetic clutch which has associated therewith an electromagnetic brake for holding said die drum against rotation when said clutch is deenergized, a drive shaft, a control circuit for said clutch and brake, and common means responsive to the rotational position of said drive shaft for closing said control circuit.

18. In a machine for continuously marking in serial order tube-like articles supplied thereto in a continuous stream, a drive shaft, a die drum having tube marking means on the surface thereof, an epicyclic tube path comprising a tube marking zone defined by a contoured tube supporting surface associated with said drum in radially spaced relation thereto, a die drum shaft, a driving connection between said drive shaft and said die drum shaft, an electromagnetic clutch between said die drum shaft and said die drum, an electromagnetic brake associated with said die drum for holding said die drum against rotation when said clutch is deenergized, an electric control circuit for said clutch and said brake, means in said control circuit responsive to a tube at the entrance of said tube marking zone for conditioning said clutch and brake control circuit for operation, and means thereafter operative to energize said clutch and brake control circuit for releasing said brake and for engaging said clutch to connect said die drum and said die drum shaft into die drum driving relation.

19. In a machine for marking tube-like articles, a cylindrical die drum, a contoured tube supporting surface associated with said die drum and spaced therefrom to form an epicyclic tube receiving throat, tube marking means carried on the face of said die drum adapted to contact a tube in said epicyclic tube receiving throat, tube transfer means for transferring a tube from a supply thereof to the entrance of said epicyclic tube receiving throat, means for selectively operating said tube transfer means at a first rate of operation and at a second rate of operation, control means for intermittently rotating said die drum, means responsive to the presence of a tube at the entrance of said tube receiving throat for energizing said control means to rotate said die drum to mark a tube and continuously advance the same through said tube receiving throat, and means responsive to said tube responsive means at the entrance of said tube receiving throat for selecting said tube transfer operating means to operate said tube transfer means at said second rate of operation in the presence of a tube at the entrance of said tube receiving throat.

References Cited by the Examiner

UNITED STATES PATENTS

| | | | |
|---|---|---|---|
| 452,598 | 5/1891 | Davis et al. | 101—40 |
| 651,329 | 6/1900 | Hagen | 101—40 |
| 1,066,488 | 7/1913 | Ginaca | 101—40 |
| 1,629,376 | 5/1927 | Buck | 101—378 |
| 1,638,850 | 8/1927 | Hebrank | 101—40 |
| 2,362,663 | 11/1944 | Redin et al. | 101—40 |
| 2,567,232 | 9/1951 | Nordquist et al. | 101—40 |
| 2,737,109 | 3/1956 | Hertsch | 101—351 X |
| 2,754,751 | 7/1956 | Marsh et al. | 101—19 |
| 2,819,671 | 1/1958 | Porter et al. | |
| 2,873,670 | 2/1959 | Ritzerfeld et al. | 101—132 |
| 2,927,527 | 3/1960 | Bradford | 101—43 |
| 3,092,019 | 6/1963 | Van Buskirk. | |

FOREIGN PATENTS 852,570   10/1960   Great Britain.

ROBERT E. PULFREY, *Primary Examiner.*

WILLIAM B. PENN, *Examiner.*

NATHANIEL A. HUMPHRIES,
  WILLIAM F. McCARTHY, *Assistant Examiners.*